United States Patent [19]

Michaelis et al.

[11] Patent Number: 4,904,796

[45] Date of Patent: Feb. 27, 1990

[54] PREPARATION OF A BLUE ANTHRAQUINONOID DISPERSE DYE OF 1,4-NAPHTHOQUINONE-[2,3-F]-PHTHALIMIDES

[75] Inventors: Eberhard Michaelis, Weingarten; Helmut Hoch, Wachenheim, both of Fed. Rep. of Germany

[73] Assignee: BASF Aktiengesellschaft, Ludwigshafen, Fed. Rep. of Germany

[21] Appl. No.: 154,577

[22] Filed: Feb. 10, 1988

[30] Foreign Application Priority Data

Feb. 20, 1987 [DE] Fed. Rep. of Germany ....... 3705386

[51] Int. Cl.$^4$ .......................... C07D 27/50; C09B 5/24
[52] U.S. Cl. ..................................................... 548/426
[58] Field of Search .................................... 548/426

[56] References Cited

U.S. PATENT DOCUMENTS

| | | | |
|---|---|---|---|
| 3,137,699 | 6/1964 | Hartwig et al. | 548/426 X |
| 3,294,815 | 12/1966 | Hartwig et al. | 548/426 |
| 3,801,595 | 4/1974 | Hartwig | 548/426 |

FOREIGN PATENT DOCUMENTS

| | | | |
|---|---|---|---|
| 1181349 | 9/1965 | Fed. Rep. of Germany | 548/426 |
| 1250031 | 9/1967 | Fed. Rep. of Germany | 548/426 |
| 1918696 | 12/1970 | Fed. Rep. of Germany | 548/426 |
| 2536051 | 2/1977 | Fed. Rep. of Germany | 548/426 |
| 485811 | 3/1970 | Switzerland | 548/426 |
| 1063379 | 7/1964 | United Kingdom | 548/426 |
| 1296774 | 11/1972 | United Kingdom | 548/426 |

*Primary Examiner*—Floyd D. Higel
*Attorney, Agent, or Firm*—Oblon, Spivak, McClelland, Maier & Neustadt

[57] ABSTRACT

Blue anthraquinonoid disperse dyes are prepared by reacting a 1-amino-4-nitroanthraquinonecarboxamide (II) with a cyanide in an aqueous medium in the presence of hydroxyl ion acceptors at above 20° C. by a process in which the reaction is carried out in water at a pH of from 7.5 to 10.5 and in the presence of one or more quaternary ammonium salts at from 60° to 100° C.

The process gives disperse dyes which are similar to C.I. Disperse Blue 87 and have similar color properties in high yields by an environmentally compatible process, the said disperse dyes having excellent properties.

20 Claims, No Drawings

PREPARATION OF A BLUE ANTHRAQUINONOID DISPERSE DYE OF 1,4-NAPHTHOQUINONE-[2,3-F]-PHTHALIMIDES

The disperse dye designated C.I. Disperse Blue 87 in the Colour Index gives useful blue colorations on polyester fiber material.

Investigations have shown that this dye is a mixture of the dyes of the formula (I)

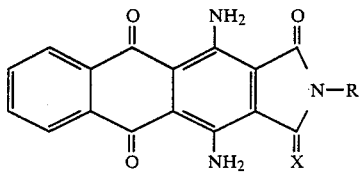

wherein R is —$(CH_2)_3$—$OCH_3$ and X is NH and X is O, in a weight ratio of about 2:1.

C.I. Disperse Blue 87 is obtained by the processes described in DE-C 11 76 777 or 11 81 349, by reacting 1-amino-4-nitroanthraquinone-2-carboxylic acid or its derivatives with water-soluble ionic cyanides in water, an alcohol or a mixture of these or in a mixture of these liquids with organic solvents. According to DE-C 19 18 696, these processes have the disdvantage that, owing to the use of alcohols, special safety measures (danger of explosion) have to be taken in the large-scale industrial production of the dyes. Since the starting material 1-amino-4-nitroanthraquinone-2-carboxylic acid and its amides are poorly soluble in water and alcohols, large volumes of solvents are required for even relatively small batches, and long reaction times are necessary for complete conversion. The resulting low space-time yield makes the process of DE-C 11 76 777 and 11 81 349 uneconomical.

Although the descriptions of DE-C 11 76 777 and 11 81 349 state that the reaction of the nitro compounds with the cyanides can also be carried out in water, no reaction in a purely aqueous medium is described in the Examples. According to Examples 4 and 10 of DE-C 11 76 777, in which the dyes obtained correspond to, or are very similar to, C.I. Disperse Blue 87, the reaction takes place in water-soluble alcohols, water being added in the course of the reaction. In the case of Example 10 of DE-C 11 76 777 and of the Example of DE-C 11 81 349, the reaction is completed at the boil in a mixture of 240 parts of methanol and 35 parts of ethylene glycol monoacetate and 56 parts of water.

Attempts to carry out the reaction of 1-amino-4-nitroanthraquinone-2-carboxylic acid 3'-methoxypropylimide with cyanide in a buffered, purely aqueous medium (ie. in the absence of solvents) showed that the reaction was sluggish and the conversion was still incomplete after 16 hours, and that byproducts were formed. The resulting dye gave dull reddish colorations, without brilliance, on polyester (cf. Comparative Example 3).

The process of DE-C 19 18 696 overcomes these disadvantages by carrying out the reaction of the nitro compound with the cyanide in formamide. This process has the advantage of a short reaction time of from 3 to 4 hours with a very concentrated reaction mixture, but also has the great disadvantage of employing an expensive solvent, which has the further disadvantage that formamide and its mixtures with water are technically very complicated to regenerate. The mixtures of formamide, ethylene glycol acetate and water which are obtained in the process of DE-C 19 18 696 cannot be regenerated economically and must therefore be incinerated or disposed of via a wastewater treatment plant. These are the great disadvantages of the process, entailing high costs.

Another advantage of the process of DE-C 19 18 696 is that the end product is obtained in the form of short, thin needles which can be particularly readily converted to the finely divided forms required for coloring. The barshaped crystals obtained in the processes of DE-C 11 81 349 and 11 76 777 are very difficult to disperse. According to the prior art, this advantage and the increased space-time yield can only be achieved using formamide as a reaction medium and accepting the serious disadvantages stated above.

It is an object of the present invention to provide a process for the preparation of the dyes (I) which avoids the disadvantages of the process of DE-C 19 18 696 but at least has its advantages.

We have found that this object is achieved, according to the invention, if the reaction of the nitro compound is carried out in water in the presence of a quaternary ammonium salt.

The present invention accordingly relates to a process for the preparation of blue anthraquinonoid disperse dyes by reacting a 1-amino-4-nitroanthraquinonecarboxamide of the formula (II)

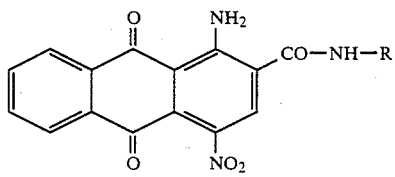

where R is $C_1$-$C_6$-alkyl, 2-($C_1$-$C_6$-alkoxy)ethyl, 3-($C_1$-$C_6$-alkoxy)propyl or 3-[2'-($C_1$-$C_4$-alkoxy)ethoxy]propyl, with a cyanide in an aqueous medium in the presence of hydroxyl ion acceptors at above 20° C., wherein the reaction is carried out in water at a pH of from 7.5 to 10.5 and in the presence of one or more quaternary ammonium salts at from 60° to 100° C.

The process gives the products in high purity and high space-time yield, and in finely divided form. The reaction is complete in 4 hours at from 70° to 100° C., whereas complete conversion is not obtained in the reactions according to DE-C 11 76 777 and 11 81 349, either in water or in alcohols or mixtures of these, even after long reaction times.

If 1-amino-4-nitroanthraquinone-2-carboxylic acid 3'-methoxypropylimide is used, the dyes obtained by the novel process have similar or superior color strength, brilliance, hue and fastness properties compared with the Disperse Blue 87 obtained in formamide by the process of DE-C 19 18 696.

The economical, technical and ecological advantages of the novel process in an aqueous medium are obvious: dispensing with regeneration, reduction in wastewater fed to the treatment plant, dispensing with expensive explosion protection precautions, dispensing with the necessity to keep stocks of the solvents and to meter and transport these.

It was surprising that the dyes obtained by the novel process are obtained in the form of short thin needles which can readily be converted to finely divided forms suitable for coloring fiber materials. In contrast, both in an aqueous medium and in an alcoholic-aqueous medium, the processes of DE-C 11 81 349 and 11 76 777 give long acicular crystals whose length is about 10 to 20 times the edge length and which can be converted to finely divided forms only at great expense.

Suitable 1-amino-4-nitroanthraquinone-2-carboxamides (II) are those in which R is $C_1$–$C_6$-alkyl, 2-($C_1$–$C_6$-alkoxy)ethyl, 3-($C_1$–$C_6$-alkoxy)propyl or 3-[2'-($C_1$–$C_4$-alkoxy)ethoxy]ethyl.

Preferred amides (II) are those in which R is 2n-butoxyethyl, 3-methoxypropyl, 3-ethoxypropyl, 3-n- or isopropoxypropyl or 3-[2'-methoxyethoxy]propyl. Among these radicals, R is particularly preferably 3-methoxypropyl, since the dyes obtained with this amide are of particular interest from a point of view of color properties and performance characteristics.

The novel process is generally carried out by initially taking a solution of the quaternary ammonium salt in from 2 to 8, preferably from 3 to 4, times the weight of water, depending on the 1-amino-4-nitroanthraquinone-2-carboxamide (II) used (also referred to below as nitraamide). The amount of quaternary salt is as a rule from 0.15 to 0.5 times the amount of (II).

(II) and the buffer substance are introduced into this solution. Thereafter, the pH of the mixture is brought to 7.5–8.5, if necessary, and the mixture is heated to 60°–100° C. When cyanide is added, (II) undergoes an exothermic reaction to give the dye. In most cases, the reaction is complete after the addition of the cyanide; if necessary, the reaction is completed by stirring at from 60° to 100° C.

The reaction mixture is worked up in a conventional manner. For this purpose, the mixture is cooled, the excess cyanide is destroyed at about 60° C. by adding from 0.2 to 0.3 mole of hydrogen peroxide (in the form of a 30% strength by weight solution) per mole of cyanide used, the reaction mixture is filtered and the press cake is washed neutral and pale.

The resulting dye (I) can be processed in a conventional manner to give formulations.

The amount of quaternary salt is from 0.15 to 0.5, preferably from 0.3 to 0.4, times the weight of the nitraamide (II).

Suitable quaternary ammonium compounds (also referred to as quaternary salts) are water-soluble trialkylbenzyl-, benzyldialkyl- and tetraalkylammonium salts, such as the tri-$C_1$–$C_4$-alkylbenzylammonium, di-$C_1$–$C_4$-alkyldibenzylammonium and tri-$C_1$–$C_4$-alkyl-$C_8$–$C_{18}$-alkylammonium salts, and furthermore benzylpyridinium and $C_{10}$–$C_{20}$-alkylpyridinium salts and mixtures of these salts.

Specific examples of quaternary ammonium salts are the trimethylbenzyl-, triethylbenzyl-, tripropylbenzyl-, dimethyldibenzyl-, diethyldibenzyl-, dipropyldibenzyl-, tetramethyl-, tetraethyl-, tetra-n-propyl-, tetra-n-butyl-, trimethyloctyl-, trimethyldecyl-, trimethyllauryl-, trimethyl-$C_{12}$–$C_{14}$-alkyl-, trimethylpalmityl- and trimethylstearylammonium salts, as well as the corresponding triethyl-$C_8$–$C_{18}$-alkylammonium salts and mixtures of these.

Preferred ammonium salts are the trimethylbenzyl-, dimethyldibenzyl-, trimethyllauryl- and trimethyl-$C_{12}$–$C_{14}$-alkylammonium salts.

The ammonium salts are as a rule used in the form of the halides, such as the chlorides or bromides, the sulfates or the alkylsulfates, eg. the methosulfates and ethosulfates.

Suitable buffer substances are those known from the prior art, for example sodium bicarbonate, sodium carbonate, potassium carbonate, disodium hydrogen phosphate, dipotassium hydrogen phosphate and mixtures of primary and tertiary phosphates.

Other buffer substances which do not undergo an undesirable reaction under the reaction conditions can also be added, these substances permitting the pH of the aqueous suspension to be buffered at pH 7.5–8.5 before the addition of the cyanide, and at pH 9.0–10.5 at the end of the reaction. Examples of suitable substances for this purpose are citrates, oxalates and/or acetates of the alkali metals.

Other buffer substances which are suitable under the reaction conditions are readily hydrolyzable esters, for example glycol monoesters, such as ethylene glycol acetate or ethylene glycol monomethyl ether acetate, glycol diesters, such as ethylene glycol diacetate, and dialkyl carbonates, such as dimethyl and diethyl carbonate.

Before the addition of the cyanide, or at the beginning of this addition, the mixture is, if necessary, brought to pH 7.5–8.5 in the presence of the buffer substance.

The amount of buffer substance is such that the pH of the reaction mixture is 9–10.5 at the end of the addition of the cyanide or at the end of the reaction. Preferably, the pH is 9.0–9.7 at the end of the reaction.

Where sodium bicarbonate, sodium carbonate or disodium hydrogen phosphate is used, from 0.8 to 1.2 moles of these buffer substances are required per mole of (II).

The amount of buffer substance required for maintaining the desired pH can be added all at once before the beginning or at the beginning of the reaction, or at the required rate, a little at a time or continuously, during the reaction.

As in the prior art processes, suitable cyanides are soluble ones, preferable the alkali metal cyanides, such as potassium cyanide and sodium cyanide, as well as calcium cyanide. The cyanides are preferably used in the form of their aqueous 20–40% strength by weight solution, since this can be most readily metered.

For economic reasons, sodium cyanide is preferred.

The reaction of (II) with the cyanide is carried out at from 60° to 100° C., preferably from 70° to 95° C., in particular from 85° to 90° C. Since the reaction of (II) with the cyanide is exothermic, the mixture need be brought to the desired temperature only at the beginning of the reaction. By the addition of cyanide (duration 1.5–4 hours, depending on the temperature), the desired reaction temperature can be maintained. Toward the end of the reaction, the mixture is, if necessary, kept at the desired temperature by heating.

As a rule, the reaction is complete after the addition of the cyanide. If necessary, the reaction mixture is kept at the desired temperature until the conversion of (II) is complete.

The reaction is generally complete after from 2 to 6 hours, in most cases after from 2.5 to 4 hours.

At reaction temperatures below 80° C., the resulting products color polyester fibers in duller hues than the products obtained at from 80° to 100° C.

The purest colorations are obtained using dyes obtained by reacting (II) with cyanide at from 85° to 90° C., and it is for this reason that this range is particularly preferred in the present process.

Temperatures greater than 100° C. have no advantage in the reaction. On the contrary, disadvantages have been found: a lower yield, and less brilliance in the case of the colorations obtained using these products. Another disadvantage is that the reaction must be carried out in closed apparatuses.

The ratio of the dyes (I) where X is >NH (=iminoimide dye (Ia) and the dye (I) where X is >O (=imide dye (Ib)) in the product can be influenced by the reaction temperature during the reaction of (II). For example, a mixture of (I) containing a higher proportion of iminoimide dye (Ia) is obtained at the lower temperatures (from 70° to 75° C.).

We have also found that the proportion of dye (Ia) in the product can be increased if the reaction is carried out at a pH of from 9.5 to 10.5. The dyes obtained in this range color polyester fiber material in brilliant blue hues which, however, are shifted toward red.

The Examples which follow illustrate the process. Parts and percentages are by weight.

The process is described for 1-amino-4-nitroanthraquinone-2-carboxylic acid 3'-methoxypropylamide (referred to as nitra-amide in the Examples).

EXAMPLE 1

275 parts of nitra-amide and 50 parts of sodium bicarbonate are introduced into 700 parts of water and 200 parts of a 35% strength aqueous solution of a $C_{12}$-$C_{14}$-alkyltrimethylammonium chloride. The stirred mixture is heated to 90° C. (pH 7.7). At this temperature, 500 parts of a 30% strength sodium cyanide solution are run in over 2.5 hours at a rate such that the temperature is kept at 90° C. without additional external heating in a bath. Thereafter, stirring is continued for a further 1.5 hours at 90° C. (pH 9.2; sample indicates complete conversion). The reaction mixture is cooled to 60° C., and 85 parts of 30% strength hydrogen peroxide are added at a rate such that a temperature of from 70° to 75° C. is maintained (a sample indicates complete destruction of the cyanide after the addition). The reaction mixture is filtered, and the press cake is washed with warm water until the outflow is neutral and colorless. Drying at 80° C. under reduced pressure gives 255 parts of a dark blue dye powder, which gives a deep, brilliant blue hue on polyester. The product corresponds to the dye known as C.I. Disperse Blue 87 in chemical composition and in purity. The dye consists of small uniform needles having a means edge length of 2 to 4 μm.

EXAMPLE 2

3,000 parts of water, 835 parts of trimethyllaurylammonium methosulfate in the form of a 40% strength aqueous solution and 240 parts of sodium bicarbonate are initially taken. Thereafter, 1,180 parts of nitra-amide are introduced, and the suspension is heated to 85° C. 2,500 parts of 30% strength aqueous sodium cyanide solution are then metered in over 3 hours at a rate such that the temperature is kept at from 85° to 90° C. After the addition of the cyanide, stirring is continued for a further 30 minutes. A sample then indicates complete conversion to the dye. The mixture is cooled to 50° C., and 400 parts of 30% strength hydrogen peroxide solution are run in at a rate such that the resulting temperature is 70°-75° C. Thereafter, a sample indicates that cyanide is no longer present. The reaction mixture is filtered, and the press cake is washed with warm water until the outflow is neutral and colorless. Drying at 80° C. under reduced pressure gives 1,040 parts of a dye powder, which colors polyester in deep, brilliant blue hues and is similar in the other properties to the dye obtained in Example 1.

EXAMPLE 3 (COMPARISON)

275 parts of nitra-amide are introduced into 700 parts of water, and 50 parts of sodium bicarbonate are added. The mixture is heated to 90° C. (pH 7.6). At this temperature, 500 parts of a 30% strength aqueous sodium cyanide solution are run in over 4 hours. The progress of the reaction is monitored by taking samples at 2-hour intervals. Even after reaction for 16 hours at 90° C., the nitra-amide is not yet completely converted (pH 9.6). The reaction is terminated, the excess cyanide is destroyed with hydrogen peroxide solution as in Example 1, the dye is isolated by filtration, and the residue is washed until the outflow is neutral and colorless. Drying at 80° C. under reduced pressure gives 245 parts of a dye powder, which colors polyester in very dull blue hues. Under the microscope, a mixture of the blue dye needles and the red bar-shaped crystals of the nitra-amide are clearly detectable.

EXAMPLE 4

200 parts of a 35% strength aqueous solution of a $C_{12}$-$C_{14}$-alkyltrimethylammonium chloride, 25 parts of disodium hydrogen phosphate, 20 parts of sodium dihydrogen phosphate and 275 parts of nitra-amide are added, while stirring, to 700 parts of water (pH 8.0). The suspension is heated to 85° C. Thereafter, 500 parts of a 30% strength aqueous sodium cyanide solution are added in the course of 2.5 hours at a rate such that the temperature is kept at from 85° to 90° C. After the addition of the cyanide, stirring is continued for a further 2 hours at 90° C. (pH 9.7). The control sample then indicates complete coversion of the nitra-amide to the dye. 85 parts of 30% strength hydrogen peroxide are run in at 60° C. at a rate such that a temperature of from 70° to 75° C. is maintained. A sample indicates complete removal of the cyanide. The reaction mixture is filtered and the residue is washed with warm water until the outflow is neutral and colorless. Drying at 80° C. under reduced pressure gives 248 parts of a dye powder, which colors polyester in brilliant, deep blue hues.

EXAMPLE 5

200 parts of a 35% strength aqueous solution of a $C_{12}$-$C_{14}$-alkyltrimethylammonium chloride, 50 parts of ethylene glycol monomethyl ether acetate and 275 parts of nitra-amide are added, while stirring, to 700 parts of water. The suspension is heated to 85° C., and 500 parts of 30% strength aqueous sodium cyanide solution are metered in over 2 hours at a rate such that the reaction temperature is kept at from 80° to 90° C. After the addition of the cyanide, stirring is continued for a further 2 hours at 90° C. (pH 9.5). The control sample shows that conversion of the nitra-amide to the dye is complete. Working up is carried out as in Example 4. 256 parts of a dye powder are obtained, the said powder coloring polyester in brilliant, deep blue hues.

EXAMPLE 6

1,149 parts of nitra-amide are introduced into a mixture of 4,500 parts water and 1,500 parts of a 30% strength aqueous solution of a $C_{12}$-$C_{14}$-alkyltrimethylammonium chloride. The mixture is stirred to give a homogeneous suspension. Thereafter, 735 parts of sodium cyanide are introduced. After the cyanide has dissolved, the pH is 11.4. The pH is reduced to 9.0 by the dropwise addition of 50 parts of ethylene glycol diacetate (from the total of 365 parts of the stock provided). The stirred mixture is then heated slowly, a slightly exothermic reaction beginning at 60° C. and the temperature increasing to about 75° C. without external heating. Stirring is continued for 2 hours at from 70° to 75° C., the pH of the reaction mixture being kept at from 9.0 to 9.3 by metering in glycol diacetate. When the control sample indicates that conversion is complete, 500 parts of a 30% strength solution of hydrogen peroxide are added dropwise at a rate such that the temperature is kept at from 70° to 75° C. After the mixture has been stirred for 1 hour, a test is carried out to determine whether the cyanide ions have been completely eliminated. The suspension is filtered, and the residue is washed with warm water until the outflow is neutral and virtually colorless. Drying at 80° C. under reduced pressure gives 1,095 parts of a dark blue dye powder, which colors polyester fibers in brilliant blue hues, the hue being slightly redder than that of Disperse Blue 87 and that of the dye obtained in Example 1. The resulting dye is a mixture of 73.8% of iminoimide dye (Ia) and 21.4% of imide dye (Ib). In Disperse Blue 87, the percentage ratio is about 63:33.

EXAMPLE 7

The procedure described in Example 6 is followed, except that the pH of the aqueous phase is kept at from 9.5 to 9.7 by adding glycol diacetate (consumption 182 parts). Working up and drying gave 1,085 parts of a dark blue dye powder, which likewise colors polyester fibers in brilliant blue hues. The hue is somewhat redder than that of the dye of Example 6. The dye contains 83% of iminoimide dye (Ia) and only 13.6% of imide dye (Ib).

EXAMPLE 8

The procedure described in Example 6 is followed, except that the pH of the aqueous phase is kept at 10.0 by adding glycol diacetate (consumption 39 parts). After a reaction time of 3 hours, the mixture is worked up and dried, these steps being carried out as described in Example 6. 988 parts of a dark blue powder are obtained, which colors polyester fibers in brilliant blue hues, the hue being shifted somewhat further toward red than in Example 7. The ratio of the components in this case is 90% of iminoimide dye (Ia) and 2.6% of imide dye (Ib).

We claim:

1. A process for the preparation of a blue anthraquinonoid disperse dye by reacting a 1-amino-4-nitroanthraquinonecarboxamide of the formula (II)

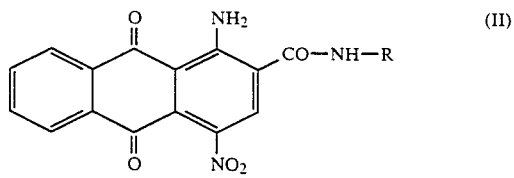

where R is $C_1$-$C_6$-alkyl, 2-($C_1$-$C_6$-alkoxy)ethyl, 3-($C_1$-$C_6$-alkoxy)propyl or 3-[2'-($C_1$-$C_4$-alkoxy)ethoxy]propyl, with a cyanide in water in the presence of a hydroxyl ion acceptor at from 60° to 100° C., at a pH of from 7.5 to 10.5 and in the presence of one or more quaternary ammonium salts.

2. A process as claimed in claim 1, wherein the reaction is carried out at a pH of from 7.6 to 10.

3. A process as claimed in claim 1, wherein the reaction is carried out at from 70° to 95° C.

4. A process as claimed in claim 2, wherein the reaction is carried out at from 70° to 95° C.

5. A process as claimed in claim 1, wherein the reaction is carried out at from 85° to 90° C.

6. A process as claimed in claim 2, wherein the raction is carried out at from 85° to 90° C.

7. A process as claimed in claim 1, wherein the quaternary ammonium salts used are water-soluble trialkylbenzylammonium, dibenzyldialkylammonium, tri-$C_1$-$C_4$-alkyl-$C_8$-$C_{18}$-alkylammonium or tetra-$C_1$-$C_4$-alkylammonium salts.

8. A process as claimed in claim 2, wherein the quaternary ammonium salts used are water-soluble trialkylbenzylammonium, dibenzyldialkylammonium, tri-$C_1$-$C_4$-alkyl-$C_8$-$C_{18}$-alkylammonium or tetra-$C_1$-$C_4$-alkylammonium salts.

9. A process as claimed in claim 3, wherein the quaternary ammonium salts used are water-soluble trialkylbenzylammonium, dibenzyldialkylammonium, tri-$C_1$-$C_4$-alkyl-$C_8$-$C_{18}$-alkylammonium or tetra-$C_1$-$C_4$-alkylammonium salts.

10. A process as claimed in claim 4, wherein the quaternary ammonium salts used are water-soluble trialkylbenzylammonium, dibenzyldialkylammonium, tri-$C_1$-$C_4$-alkyl-$C_8$-$C_{18}$-alkylammonium or tetra-$C_1$-$C_4$-alkylammonium salts.

11. A process as claimed in claim 5, wherein the quaternary ammonium salts used are water-soluble trialkylbenzylammonium, dibenzyldialkylammonium, tri-$C_1$-$C_4$-alkyl-$C_8$-$C_{18}$-alkylammonium or tetra-$C_1$-$C_4$-alkylammonium salts.

12. A process as claimed in claim 6, wherein the quaternary ammonium salts used are water-soluble trialkylbenzylammonium, dibenzyldialkylammonium, tri-$C_1$-$C_4$-alkyl-$C_8$-$C_{18}$-alkylammonium or tetra-$C_1$-$C_4$-alkylammonium salts.

13. A process as claimed in claim 2, wherein water-soluble trimethylbenzyl-, dimethyldibenzyl, trimethyllauryl or trimethyl-$C_{12}$-$C_{14}$-alkylammonium salts or mixtures of these salts are used as quaternary ammonium salts.

14. A process as claimed in claim 3, wherein water-soluble trimethylbenzyl-, dimethyldibenzyl, trimethyllauryl- or trimethyl-$C_{12}$-$C_{14}$-alkylammonium salts or mixtures of these salts are used as quaternary ammonium salts.

15. A process as claimed in claim 4, wherein water-soluble trimethylbenzyl-, dimethyldibenzyl, trimethyllauryl- or trimethyl-$C_{12}$-$C_{14}$-alkylammonium salts or mixtures of these salts are used as quaternary ammonium salts.

16. A process as claimed in claim 5, wherein water-soluble trimethylbenzyl-, dimethyldibenzyl, trimethyllauryl- or trimethyl-$C_{12}$-$C_{14}$-alkylammonium salts or mixtures of these salts are used as quaternary ammonium salts.

17. A process as claimed in claim 6, wherein water-soluble trimethylbenzyl-, dimethyldibenzyl, trimethyllauryl- or trimethyl-$C_{12}$-$C_{14}$-alkylammonium salts or mixtures of these salts are used as quaternary ammonium salts.

18. A process as claimed in claim 1, wherein R is 2-butoxyethyl, 3-methoxypropyl, 3-ethoxypropyl, 3-n- propoxypropyl, 3-isopropoxypropyl or 3-(2'-methoxyethoxy)propyl.

19. A process as claimed in claim 6, wherein R is 2-butoxyethyl, 3-methoxypropyl, 3-ethoxypropyl, 3-n-propoxypropyl, 3-isopropoxypropyl or 3-(2'-methoxyethoxy)propyl.

20. A process as claimed in claim 6, wherein R is 3-methoxypropyl.

* * * * *